(12) United States Patent
Kaschel

(10) Patent No.: US 6,732,493 B2
(45) Date of Patent: May 11, 2004

(54) METHOD FOR PACKAGING FOODS

(75) Inventor: Gregor Kaschel, Bomlitz (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 10/439,466

(22) Filed: May 16, 2003

(65) Prior Publication Data

US 2003/0207060 A1 Nov. 6, 2003

Related U.S. Application Data

(62) Division of application No. 09/720,960, filed on Jan. 3, 2001, now Pat. No. 6,613,407.

(30) Foreign Application Priority Data

Jul. 10, 1998 (DE) .......................................... 198 30 976

(51) Int. Cl.$^7$ ................................................ B65B 53/00
(52) U.S. Cl. ...................... 53/441; 428/34.1; 428/34.8; 428/35.2; 428/35.7
(58) Field of Search ........................... 53/441; 428/34.1, 428/34.8, 35.2, 35.7

(56) References Cited

U.S. PATENT DOCUMENTS

| 4,997,710 A | 3/1991 | Pockat et al. ................ 428/349 |
| 5,491,009 A | 2/1996 | Bekele ....................... 428/35.7 |
| 5,741,566 A | 4/1998 | Högstrmöm et al. ...... 428/35.2 |
| 5,906,850 A | 5/1999 | Gasse et al. ................ 426/412 |

FOREIGN PATENT DOCUMENTS

| CA | 2172019 | 9/1996 |
| GB | 2251420 | 7/1992 |
| WO | 98/28132 | 7/1998 |

*Primary Examiner*—Harold Pyon
*Assistant Examiner*—Walter Aughenbaugh
(74) *Attorney, Agent, or Firm*—Norris McLaughlin & Marcus

(57) ABSTRACT

A method for packaging food, which comprises packaging food in an at least eight-layer co-extruded, adhesive free and EVOH-free thermoformable film comprised of polyamide, polyolefin, and/or copolymers based on olefins, wherein the film has a first outer layer comprised of polyamide, a second outer layer comprised of a polyolefin or olefin copolymer and the film does not delaminate at temperatures between 50° C. and 150° C.

15 Claims, No Drawings

METHOD FOR PACKAGING FOODS

This application is a Division of application Ser. No. 09/720,960 filed Mar. 1, 2001, now U.S. Pat. No 6,613,407.

The present invention relates to a thermoformable, multilayer, co-extruded adhesive-free and EVOH-free film containing polyamide, polyolefins and/or copolymers based on olefins. This film is particularly suitable for the packaging of products that have been subjected to a heat treatment in thermoformed films. The films are characterised by an outer layer of polyamide and a second outer layer of polyolefins or copolymers based on olefins, wherein the film composite does not delaminate even at temperatures between 50° C. and 150° C.

In order to simplify the discussion of the prior art and the invention, the polymers that are used for films in the field of the present invention are discussed in more detail hereinafter, and abbreviations that are used for these polymers in the further description are introduced. Insofar as specific polymers are named here, these are suitable for the corresponding layers of the film according to the invention.

The term polyamide (abbreviation "PA") is understood to mean in the widest sense polymeric compounds that are coupled to one another by the acid amide group R—NH—CO—R'. A distinction is made between two groups of polyamides: those built up from one building block by polycondensation of ω-aminocarboxylic acids or polymerisation of their lactams to form the polyamide-6 type, and those built up from two building blocks, namely diamines and dicarboxylic acids, by polycondensation to form the polyamide-66 type. Other conventional polyamides are also copolyamides formed by a combination of the aforementioned types of polyamides.

"PO" is a generic abbreviation for polyolefins. Examples of polyolefins are low density polyethylenes (LDPE), high density polyethylenes (HDPE), low density linear polyethylene (LLDPE), polypropylene (PP), polyisobutylene, polybutylene and all further polymers that are formed from olefins. In addition the expression PO covers olefin copolymers consisting of olefins and other monomers, in whose composition olefins predominate. Such compounds include for example ethylene copolymers with unsaturated esters (e.g. vinyl acetate), ethylene copolymers with unsaturated carboxylic acids or their salts.

"PP" denotes polypropylene, irrespective of the spatial arrangement of the side-position methyl groups. "EPC" denotes copolymers of propylene with 1 to 10 mole % of ethylene, the ethylene being statistically distributed in the molecule.

"LPDE" denotes low density polyethylene that is in the density range from 0.86 to 0.93 g/cm$^3$. The LDPE molecules are characterised by a high degree of branching.

"LLDPE" denotes low density linear polyethylenes that contain, in addition to ethylene, one or more α-olefins with more than 3 C atoms as comonomers. Examples of α-olefins that may be mentioned here include butene-1, hexene-1, 4methylpentene-1 and octene-1. The molecular structure typical of LLDPE, which is characterised by a linear main chain with side chains attached thereto, is produced by the polymerisation of the aforementioned compounds. The density varies between 0.86 and 0.935 g/cm$^3$. The melt flow index MFR is normally between 0.3 and 8 g/10 min. In some publications the linear ethylene-α-olefin copolymers are subdivided according to their density into VLDPE or ULDPE. Since however according to Gnauck/Fründt (Einstieg in die Kunststoffchemie, Hanser Verlag 1991, p.58) the properties, processing and use of these copolymers largely correspond to those of ethylene homopolymers, a more precise differentiation will not be adopted here.

"HDPE" denotes high density linear polyethylenes that have only a small degree of branching in their molecular chains. The density of the HDPE may vary between 0.93 g/cm$^3$ and up to 0.97 g/cm$^3$.

"mPE" denotes in this context an ethylene copolymer that has been polymerised by means of metallocene catalysts. An (α-olefin with four or more carbon atoms is preferably used as comonomer. The polymers produced using conventional Ziegler-Natta catalysts frequently contain in the low molecular weight fractions relatively high concentrations of the α-olefins. As a consequence of the very uniform catalytically active metallocene centres, one finds narrow molecular weight distributions and, under fractionation, a very uniform incorporation of the α-olefins in both the high molecular weight and low molecular weight fractions. The density is preferably between 0.900 and 0.930 g/cm$^3$. The molecular weight distribution $M_w/M_n$ is less than 3.5, preferably less than 3.

"EAA" denotes copolymers consisting of ethylene and acrylic acid and "EMAA" denotes copolymers consisting of ethylene and methacrylic acid. The ethylene content is preferably between 60 and 99 mole %.

"I" denotes copolymers based on olefins whose molecules are crosslinked via ionic bonds. The ionic bonds are reversible, which means that the ionic crosslinking is broken at the conventional processing temperatures (180° C. to 290° C.) and are reformed in the cooling phase. Copolymers of ethylene and acrylic acids that are crosslinked with sodium or zinc ions are normally used as polymers.

"EVA" denotes a copolymer consisting of ethylene and vinyl acetate. The ethylene content is preferably between 60 and 99 mole %.

"HV" denotes co-extrudable, coupling polymers. In contrast the term adhesives denotes non-metallic materials, including polymers, that can join two film layers by surface adhesion and internal strength without substantially altering the structure of the joined film layers. In contrast to coupling agents, adhesives are not co-extrudable but have to be applied separately by surface application, e.g. by lamination or liquid application.

Coupling agents are preferably modified polyolefins, such as for example LDPE, LLDPE, mPE, EVA, EAA, EMAA, PP, EPC, which are grafted with at least one monomer from the group comprising α,β-singly unsaturated dicarboxylic acids, such as for example maleic acid, fumaric acid, itaconic acid or their acid anhydrides, acid esters, acid amides and acid imides. As extrudable coupling agents there may be used in addition copolymers of methylene with α,β-singly unsaturated dicarboxylic acids, such as acrylic acid, methacrylic acid and/or their metal salts with zinc or sodium and/or their alkyl ($C_1$–$C_4$) esters, which may also be grafted with at least one monomer from the group comprising α,β-singly unsaturated dicarboxylic acids, such as for example maleic acid, fumaric acid, itaconic acid or their acid anhydrides, acid esters, acid amides and acid imides. In addition there may also be used polyolefins such as for example polyethylene, polypropylene, ethylene/propylene copolymers or ethylene/α-olefin copolymers, which may be grafted with copolymers of ethylene with α,β-singly unsaturated dicarboxylic acids, such as acrylic acid, methacrylic acid and/or their metal salts with zinc or sodium and/or their alkyl ($C_1$–$C_4$) esters. Particularly suitable as bonding agents are polyolefins, especially ethylene/α-olefin copolymers with grafted-on α,β-singly unsaturated dicarboxylic acid anhydrides, in particular maleic anhydride. The HV may also contain an ethylene/vinyl acetate copolymer, preferably with a vinyl acetate content of at least 10 wt. %.

Different layers of a film are separated by "/". Mixtures of polymers of a layer are characterised by round brackets and joined by a "+". Thus, the film structure ". . . /LLDPE/(mPE+LDPE)" describes a multilayer film, one outer layer containing a mixture of mPE and LDPE. An inner layer consists of LLDPE. The remaining layers of the film are denoted by ". . . ".

EP 0 490 558 describes a process for heating packaged foodstuffs. The thermoformable tray film consisting of (glycol-modified polyethylene terephthalate +polycarbonate)/HV/EVOH/HV/LLDPE in thicknesses of 200/10/15/10/100 μm is thermoformed, filled with food, and sealed with a microperforated cover film consisting of polyamide and polyethylene. The holes in the cover film have a diameter of ca. 85 μm. The pack is deep frozen and immediately before use is heated in boiling water. The pores are sufficiently large in order to allow air to escape during the cooking process, and are small enough to prevent the penetration of water. Packagings of this type are unsuitable for protecting products under atmospheric conditions, since bacteria, yeast or mould can penetrate through the perforated cover film.

WO 94/19186 describes a symmetrical film with the film structure polyolefin/coupling agent/PA/EVOH/PA/coupling agent/polyolefin. The polyamide is preferably an aromatic PA or one derived therefrom that does not contain caprolactam. It is emphasised that it is possible to remove the outerlying coupling agent layers and polyolefin layers from the film. Although films of this type can be sterilised in an aqueous atmosphere in an autoclave, in water the EVOH layer becomes loose at the cut edges of the film. This can lead to a delamination of the film between the two PA layers, since the EVOH is dissolved and removed by the water. The higher the chosen temperature, the greater the delamination.

US 04 997 710 describes a seven-layer film with the structure PA/HV/LLDPE/HV/EVOH/HV/sealing layer. With this film too the inner-lying EVOH layer at the cut edges is exposed to moisture during the heat treatment. This can in turn lead to a delamination of the film.

DE 19 510 136 describes a multilayer adhesive-free film with the structure PA/HV/PA/HV/PE. This film is not co-extruded since the sealing layer consisting of PE is extrusion-coated. Due to the extrusion coating the bonding between the HV layer and the PE layer is not as high as in a fully co-extruded film, in which all layers are brought together in one tool.

The same production process forms the basis of DE 19 507 215 the multilayer, adhesive-free film with the structure PA/HV/PA/HV/I, which may optionally be supplemented by a further HV layer between HV and I, has been specially developed for the manufacture of cooking/pickling utensils. On account of the production process, the I layer is extrusion-coated and on cooking the film tends to undergo delamination in the coating plane. When the film is separated from the boiled ham residues of the film may adhere to the surface of the ham, which is undesirable.

The object therefore existed of providing a film with improved, high composite adhesion and sealing strength, in particular during a heat treatment in an aqueous environment, which can also be thermoformed. In addition it should be ensured, for example when preparing boiled ham, in which appropriate films are used as cooking aids, that when the ham is removed from the film no film residues remain on the ham since any film residues must be removed before consumption. In the packaging of ready-cooked dishes and prepared meals, which are heated for example at 100° C. in a water bath, it must be ensured that the packaging remains sealed. In the case of films with a low composite adhesion and sealing strength the contents of the pack would escape into the water bath. In the case of products that are sterilised in the pack, the latter must not leak under the sterilisation conditions.

The aforementioned object is achieved according to the invention by a multilayer film comprising layers of polyamide and of olefins or olefin copolymers, in which the film composite is produced by co-extrusion in order to improve the composite adhesion and does not contain any EVOH.

The film according to the invention accordingly comprises an at least 8-layer co-extruded, adhesive-free and EVOH-free film built up from a) an outer layer 10 containing a polyamide or a mixture of various polyamides,
b) an outer layer 24 containing a polyolefin or olefin copolymers or a mixture of these polymers,
c) an inner layer 18 containing a polyamide or a mixture of various polyamides,
d) an inner layer 14 containing a polyolefin or olefin copolymer or a mixture of these polymers,
e) an inner layer 12 adjoining the outer layer 10 and the inner layer 14, and containing a coupling polymer,
f) an inner layer 16 adjoining the inner layers 14 and 18, and containing a coupling polymer,
g) an inner layer 20 adjoining the inner layers 18 and 22 and containing a coupling polymer,
h) an inner layer 22 adjoining the inner layer 20 and the outer layer 24, and containing a polyolefin or olefin copolymer or a mixture of these polymers.

The typical structure of the film according to the invention is illustrated diagrammatically once more in the following Table:

| Layer | Polymer | Remarks |
| --- | --- | --- |
| 10 | Polyamide | Outer layer |
| 12 | Coupling Agent | |
| 14 | Polyolefin/Olefin Copolymer | |
| 16 | Coupling Agent | |
| 18 | Polyamide | |
| 20 | Coupling Agent | |
| 22 | Polyolefin/Olefin Copolymer | |
| 24 | Polyolefin/Olefin Copolymer | Outer layer, sealing layer |

The film according to the invention can be extruded in all conventional extrusion devices in which polyamide or polyolefins can be processed.

The outer layer 10 and inner layer 18 contain as polyamide preferably PA6, PA11, PA12 or PA66, copolyamides based on these polyamides, or mixtures of these polymers. Suitable copolyamides are in particular PA6/66, PA6/12, PA6/6I, PA6/IPDI, PA66/610, PA6/11/66. In order to improve the oxygen barrier or thermoformability, the polyamides or polyamide mixtures may be mixed with partially aromatic PAs, in particular with PA6I/6T, PAMXD6 or PA6I.

The layers consisting of PA may be modified by additives. Suitable additives are for example crystallisation aids, lubricants and processing aids.

The polyamides may furthermore be modified by layer-like particles. The layer-like particles may consist of organic as well as of inorganic materials. The fibre length of the particle, which is normally below 700 nm, is regarded as the characteristic particle diameter. The oxygen barrier or the tensile strength for example of the film may be improved by adding these particles.

A further feature is the permeability of radiation, in particular ultraviolet radiation (from 200 to 380 nm). It has been found that some PA types can absorb certain wavelengths of UV light and are thus better able to protect sensitive products, for example meat.

The outer layer 24 contains polyolefins or olefin copolymers or a mixture of these polymers. LDPE, LLDPE, mPE, I, HDPE, PP, EPC or mixtures of these polymers are preferably used. In order to improve the anti-friction properties lubricants and anti-blocking agents may be added. The amount of lubricant should be between 50 and 2000 ppm, depending on the layer thickness, higher concentrations being preferred with smaller layer thicknesses. The amount of anti-blocking agent in the outer layer should be between 50 and 3000 ppm, preferably between 100 and 2000 ppm.

The inner layers 12, 16 and 20 contain an extrudable coupling agent. Modified polyolefins or olefin copolymers are preferably used as coupling agents. The coupling agents increase the composite adhesion between two otherwise non-adhering layers.

The inner layer 14 contains polyolefins or olefin copolymers or mixtures of these polymers. The materials of the inner layers 12 and 16 are adapted to the inner layer 14 so that the adhesion of the layers is guaranteed even at high temperatures, especially at the intended application temperature.

The inner layer 22 contains polyolefins or olefin copolymers or mixtures of these polymers that are chosen so that the inner layer 22 adheres to the inner layer 20 and to the outer layer 24 even at high application temperatures. In addition it supports the sealing layer during the sealing process.

All layers containing polyolefins or olefin copolymers or mixtures of these polymers are preferably chosen so that they melt above the maximum application temperature.

The maximum application temperature is understood to be the maximum temperature that is reached during the heat treatment of a packaging produced from the film according to the invention. The layers consisting of polyamide are preferably chosen so that they melt at temperatures of more than 40° C. above the maximum application temperature.

If the packaging is treated at temperatures close to the boiling point of water at atmospheric pressure (ca. 100° C.), then the olefin-based layers particularly preferably consist of linear molecules that have a melting point above 110° C. At application temperatures of up to ca. 121° C., linear, ethylene-based polyolefins or olefin copolymers are preferably used. Above 121° C. propylene-based olefins or olefin copolymers are preferably used.

At maximum application temperature below ca. 80° C., such as occur for example when preparing boiled ham, the layers of polyolefins or olefin copolymers preferably contain ionomers, EAA, EMAA, LLDPE, EVA, mPE or mixtures of the aforementioned polymers. In particular the adhesion of the meat to the film can be improved by such polar polymers, for example ionomers.

Films with the film structure according to the invention are suitable for the packaging of a very wide range of foodstuffs, regardless of whether they constitute one or more solid or liquid phases or a combination of the said phases. The films are suitable for the packaging of hot-packed products. However, they are particularly suitable for producing packaging for products that are subjected to a heat treatment, in which the packaging must not delaminate. They are most particularly suitable for producing packagings that are heat-treated at temperatures of 50° C. to 150° C.

Films having the structure according to the invention are particularly suitable for thermoforming applications. Thermoforming is understood to mean the shaping and forming of a film or sheet which, after heating, is pressed or drawn by means of compressed air or a piston into a preshaped tray. During the thermoforming process the film thickness decreases corresponding to the stretching conditions.

In order to improve the anti-friction properties conventional lubricants and anti-blocking agents may be added to the film. Examples of anti-blocking agents are known solid organic or inorganic particles that project from the external surface of the sealing layer and in this way improve the anti-friction behaviour of the film. Suitable compounds include silicon dioxide, calcium carbonate, magnesium silicate, aluminium silicate, calcium phosphate, talcum and the like. Of the above compounds, silicon dioxide is preferably used. Known organic anti-blocking agents are for example incompatible polymers such as polyesters and polycarbonate. Effective amounts are in the range from 0.05 to 2 wt. %, preferably 0.1 to 0.8 wt. %. The mean particle size is between 1 and 10 µm, in which connection particles of a spherical shape are particularly suitable. Preferably these particles are used only in one or both outer layers.

Other additives that improve the anti-friction properties of the film, also in co-operation with the aforementioned solid particles, are those compounds normally described as lubricants, including higher aliphatic acid amides, higher aliphatic acid esters, waxes, metal soaps as well as polydimethylsiloxanes or other substances as specified by Piringer (Otto Piringer: Verpackungen für Lebensmittel, VCH Verlagsgesellschaft 1993, see page 53). The effective amount of lubricant is in the range from 0.01 to 3 wt. %, preferably 0.02 to 1 wt. %. It is particularly suitable to add higher aliphatic acid amides in the range from 0.01 to 0.25 wt. %. An aliphatic acid amide that is particularly suitable for the outer layers is erucamide.

The total amount of lubricant in the film should not exceed 1000 ppm. With thicker films smaller absolute amounts of lubricant are desirable since otherwise there will be an increased deposition of the lubricant on the surface of the film. In extreme cases optically obtrusive spots consisting of lubricant may form on the film.

One or more layers of the film according to the invention may be coloured.

A film according to the invention may contain further conventional additives such as anti-fogging agents or anti-statics in conventional amounts. According to Dominghaus (Die Kunststoffe und ihre Eigenschaften, VDI-Verlag, Düsseldorf 1992, p.23) known antistatics in the case of the so-called internal antistatics are ethoxylated tertiary amines of fatty acids or ethoxylated glycol esters of fatty acids, or in the case of the external antistatics are quaternary ammonium salts of fatty acids. Interface-active substances that prevent the deposition and coating of the surface of the film with fine water droplets are termed anti-fogging agent or also anti-deposition agents. Known anti-fogging agents are for example glycerol fatty acid esters or polyoxyethylene sorbitan monooleate.

The outer layer 24 may be formed as a peel layer. A known method of producing the peel effect is to add polybutylene to polyethylenes or ethylenic copolymers (Ahlhaus: Verpacken mit Kunststoffen, Carl Hanser Verlag 1997, p.239).

The overall thickness of the film should preferably be at most 400 μm, particularly preferably less than 250 μm. The layer thickness of the polyamide referred to the overall thickness of the film should preferably not exceed 40%. The ratio of the polyamide layers (outer layer 10 relative to the inner layer 18) may be freely chosen over a wide range. The sum of the layer thicknesses acting as coupling agents, referred to the overall thickness of the film, should preferably be less than 30%, particularly preferably less than 20%. The ratio of the inner layer thickness 14 referred to the overall thickness of the film should preferably be between 5% and 30%.

Possible film structures according to the invention are shown in the following table, which is a diagrammatic summary and is therefore not complete. The polymers listed in the exemplary structures may differ within the structure of the film and do not have to have the same polymeric composition. Thus, in the structure no. 1 for example the PA types may be different, and the same also applies to the HV-based and olefin-based layers.

| No. | Structure |
| --- | --- |
| 1 | PA/HV/LDPE/HV/PA/HV/LDPE/EVA |
| 2 | PA/HV/LDPE/HV/PA/HV/EVA/EAA |
| 3 | PA/HV/EVA/HV/PA/HV/EMAA/I |
| 4 | PA/HV/LLDPE/HV/PA/HV/LLDPE/LLDPE |
| 5 | PA/HV/mPE/HV/PA/HV/EVA/EVA |
| 6 | PA/HV/LLDPE/HV/PA/HV/mPE/HDPE |
| 7 | PA/HV/EPC/HV/PA/HV/EPC/PP |
| 8 | PA/HV/PP/HV/PA/HV/EPC/EPC |

Determination of the Melting Point of Plastics Films with the Melting Table Microscope The test method is used to determine the melting point of a layer in a plastics film. The melting point is understood to be the temperature at which the crystal lattice breaks down under atmospheric pressure. The sample to be measured (a microtome section of the film) is heated on a heating table and observed under a microscope in polarised transmitted light. If a layer of the film consists of a partially crystalline, double refractive plastics, it loses this property when it melts, which can be observed in polarised light when the sample is arranged between crossed polarisation filters. If the film layer does not exhibit any double refraction or only a weak double refraction, the temperature range in which the sample melts on the object carrier can be determined by observing the sample in unpolarised transmitted light. In most cases the melting point can be specified to an accuracy of +/−1° C.

The melt flow rates (MFR) given hereinafter refer to the value measured according to DIN ISO 1133. Unless otherwise specified, the measurement conditions as regards the temperature and applied mass are condition D in DIN ISO 1133, i.e. a temperature of 190° C. and an applied mass of 2.16 kg.

The density of the raw materials refers to the measurement method according to ISO 1183 (A).

All raw materials that are used are commercially obtainable.

The melting points of the polyamide-containing layers are above 170° C. in all the examples and comparison examples.

EXAMPLE 1

A multilayer blown film with the structure (80% PA-1+ 20% PA6/12)/HV-1/LLDPE-1/HV-1/(80% PA-1+20% PA6/12)/I-1/EAA/I-2 is produced by co-extrusion in the layer thicknesses 47/14/42/13/39/24/30/22 μm. The coupling agent HV-1 is the same in all layers and is based on LLDPE grafted with maleic anhydride, the MFR being 21 g/10 min and the density 914 kg/m$^3$. The melting point of the coupling layer HV-1 is 122° C. The PA-1 is PA6 with a density of 1130 kg/m3 and a relative solution viscosity of 4 in m-cresol (c=10 g/l). The copolyamide PA6/12 contains 40% of laurinlactam, the density is 1050 kg/m$^3$ and the MVI (measured according to ISO 1033 at 190° C./5 kg) is ca. 25 ml/10 min. The LLDPE-1 is a linear PE of density 911 kg/m$^3$ and has an MFR of 0.9 g/10 min, and the melting point is 118° C.; the comonomer is butene-1. The I-1 is an ionomer of density 940 kg/m$^3$ and a MFR of 4 g/10 min; it is a copolymer of ethylene with ca. 10% of methacrylic acid and 4% of butylacrylate, partially neutralised with zinc. The 1-2 is an ionomer of density 940 kg/m$^3$ and a MFR of 1 g/10 min; it is a copolymer of ethylene with ca. 14% of methacrylic acid, partially neutralised with zinc. The EAA contains ca. 9.5% of acrylic acid, the density is 938 kg/m$^3$, and the MFR is 1.5 g/10 min. The melting point of the I-1 is 87° C., of the EAA is 98° C. and of the I-2 is 94° C.

Comparison Example 2

A multilayer, adhesive-free film is produced having the structure (85% PA-2+15% PA6I/6T)/HV-3/(85% PA-2+15% PA6I/6T)/HV-3/EMAA/I-3 in the layer thicknesses 40/10/40/10/75/25 μm, the layers EMAA/I-3 on the already previously fabricated composite being coated. The PA-2 is PA6 of density 1140 kg/m$^3$ with a relative solution viscosity of 3.8 measured in m-cresol (c=10 g/l). The amorphous PA6I/6T corresponds to the compound mentioned in Example 1. The coupling agent HV-3 contains LLDPE grafted with maleic anhydride; the MFR is 4 g/10 min., the density is 910 kg/m$^3$, and the melting point is 124° C. The EMAA is a copolymer of ethylene with ca. 6% of methacrylic acid, the MFR is 9 g/10 min. and the density is 930 kg/M$^3$. The outer layer consists of an ionomer I-3 which is copolymerised with ca. 15 wt. % of methacrylic acid and has been partially neutralised with zinc ions. The density of the I-3 is 940 kg/m$^3$ and the MFR is ca. 4.5 g/10 min. The melting point of the HV-3 layer is 120° C., of the EMAA layer is 103° C. and of the I-3 layer is 93° C.

Both films were heated on a thermoforming machine (Multivac) and then thermoformed. The resultant trays are filled with boiled ham, sealed with a cover film and then cooked for 2 hours at 75° C. in an aqueous atmosphere in a mould adapted to the geometry of the packaging. After the cooking, the packagings are cooled and the film is then removed. In the case of the film from Example 1 delamination did not occur at all, while in the case of the film from Comparison Example 2 film residues, caused by delamination of the film during the cooking process, remained on the meat in more than 5% of all cases. The results obtained were confirmed in further comparable tests involving the preparation of boiled ham under different cooking conditions.

EXAMPLE 3

A multilayer blown film having the structure (95% PA-1+ 5% PA6I/6T)/HV-1/LLDPE-3/HV-1/PA-1/HV-l/LLDPE-3/ (66% LLDPE-2+34% LLDPE-3) is produced by co-extrusion in the layer thicknesses 25/7/19/7/15/7/12/18 μm. The coupling agent HV-1 and the polyamide PA-1 correspond to those of Example 1. The copolyamide PA6I/6T corresponds to that of Comparison Example 2. The LLDPE-3 is a linear PE of density 920 kg/m$^3$ and has a MFR of 1 g/10 min, and the melting point is 124° C.; the comonomer is octene-l. The LLDPE-2 is a linear PE of density 940 kg/m³ and has an MFR of 1 g/10 min, and the melting point is 125° C.; the comonomer is octene-1.

Comparison Example 4

A multilayer, adhesive-free film is produced having the structure PA-2/HV-3/(85% PA-2+15% PA6I/6T)/HV-3(80% LLDPE-4+20% LDPE) in the layer thicknesses 35/10/35/10/55 μm, the layer (80% LLDPE-4+20% LDPE) being coated on the already previously prepared composite. The PA-2, the amorphous PA6I/6T and the coupling agent HV-3 correspond to those mentioned in Comparison Example 2. The LLDPE-4 contains ethylene and ocetene-1, the MFR is 4 g/10 min. and the density is 940 kg/M³ The LDPE has a density of 924 kg/m³ and an MFR of 3.8 g/10 min. The melting point of the sealing layer is ca. 121° C.

Three samples of DIN A4 size were cut out in each case from Example 3 and Comparison Example 4, folded crosswise and sealed on all four sides, a small opening being left for filling with water without sealing. Water was added through the opening and the arrangement was then sealed. The air space remaining in the pack is less than 20% referred to the whole contents of the pack. The packs were then boiled in boiling water for 45 minutes. No water had escaped from the packs of the exemplary film 3 whereas water had escaped from the packs of the Comparison Example 4.

These examples confirm that the films according to the invention are better able to withstand the high application temperatures than the comparison examples that reflect the prior art.

What is claimed is:

1. A method of packaging food, which compromises packaging said food in an at least eight-layer co-extruded, adhesive-free and ethylene vinyl alcohol (EVOH)-free film comprised of
   a) a first outer layer (10) containing a polyamide or a mixture of various polyamides,
   b) a second outer layer (24) containing a polyolefin or olefin copolymer or a mixture of these polymers,
   c) a fourth inner layer (18) containing a polyamide or a mixture of various polyamides,
   d) a second inner layer (14) containing a polyolefin or olefin copolymer or a mixture of these polymers,
   e) a first inner layer (12) adjoining the first outer layer (10) and the second inner layer (14) and containing a coupling polymer,
   f) a third inner layer (16) adjoining the second and fourth inner layers (14 and 18), and containing a coupling polymer,
   g) a fifth inner layer (20) adjoining fourth inner layer (18) and a sixth inner layer (22), and containing a coupling polymer,
   h) said sixth inner layer (22) adjoining the fifth inner layer (20) and the second outer layer (24), and containing a polyolefin or olefin copolymer or a mixture of these polymers.

2. The method of claim 1, wherein all layers have a melting point that lies above the maximum application temperature.

3. The method of claim 1, wherein the first outer layer (10) and the fourth inner layer (18) contain PA6, PA11, PA12, PA66, copolyamides based on these polyamides, or mixtures of these polymers.

4. The method of claim 1, wherein the first outer layer (10) and the fourth inner layer (18) contain mixtures of polyamides with a proportion of partially aromatic polyamides.

5. The method of claim 1, wherein the first, third and fifth inner layers (12, 16 and 20) each independently contain as coupling polymers a modified polyolefin or an olefin copolymer.

6. The method of claim 1, wherein the overall thickness of the film is at most 400 pm.

7. The method of claim 1, wherein the sum of the layer thicknesses of the first, third and fifth inner layers (12, 16 and 20) containing the coupling polymers is less than 30% of the overall layer thickness.

8. A package of food packaged by the method of claim 1.

9. A packaging of food according to claim 8, wherein the packaging is in the form of a thermoformed packaging tray.

10. The method of claim 3 wherein the first outer layer (10) and the fourth inner layer (18) contain polyamides selected from the group consisting of PA6/66, PA6/12, PA6/61, PA6/IPDI (polyamide 6/1-amino-,3-aminomethyl-,3,5,5-trimethyl-cyclohexane), PA66/610, PA6/11/66 and mixtures thereof.

11. The method of claim 4, wherein the mixtures of polyamides with partially aromatic polymers of outer layer 10 and inner layer 18 are each selected independently from PA62/6T, PAMXD6 AND PA6I.

12. The method of claim 1 wherein said polyolefin or olefin copolymer of second outer layer (24) is selected from the group consisting of low density polyethylene (LDPE), linear low density polyethylene (LLDPE), metalocenic polyethylene (mPE), olefin copolymers crosslinked via ionic bonds (I), linear high density polyethylene (HDPE), polypropylene (PP), ethylene/propylene copolymers (EPC) and mixtures thereof.

13. The method of claim 6, wherein the overall thickness of the film is less than 250 μm.

14. The method of claim 7, wherein the sum of the layer thickness of the first, third and fifth inner layers (12, 16 and 20) containing the coupling polymers is less than 20% of the overall layer thickness.

15. The method of claim 1, wherein said food is a food prepared for claim cooking.

* * * * *

UNITED STATES PATENT AND TRADEMARK OFFICE
CERTIFICATE OF CORRECTION

PATENT NO. : 6,732,493 B2 Page 1 of 1
DATED : May 11, 2004
INVENTOR(S) : Kaschel It is certified that error appears in the above-identified patent and that said Letters Patent is hereby corrected as shown below:

<u>Column 2,</u>
Line 9, "(α-olefin" should read -- α-olefin --

<u>Column 10,</u>
Line 19, "400 pm" should read -- 400 μm --

Signed and Sealed this

Fifteenth Day of February, 2005

JON W. DUDAS
*Director of the United States Patent and Trademark Office*